March 24, 1959 L. M. DOLHUN 2,879,093
SELF CONTAINED SEALS
Original Filed May 15, 1951
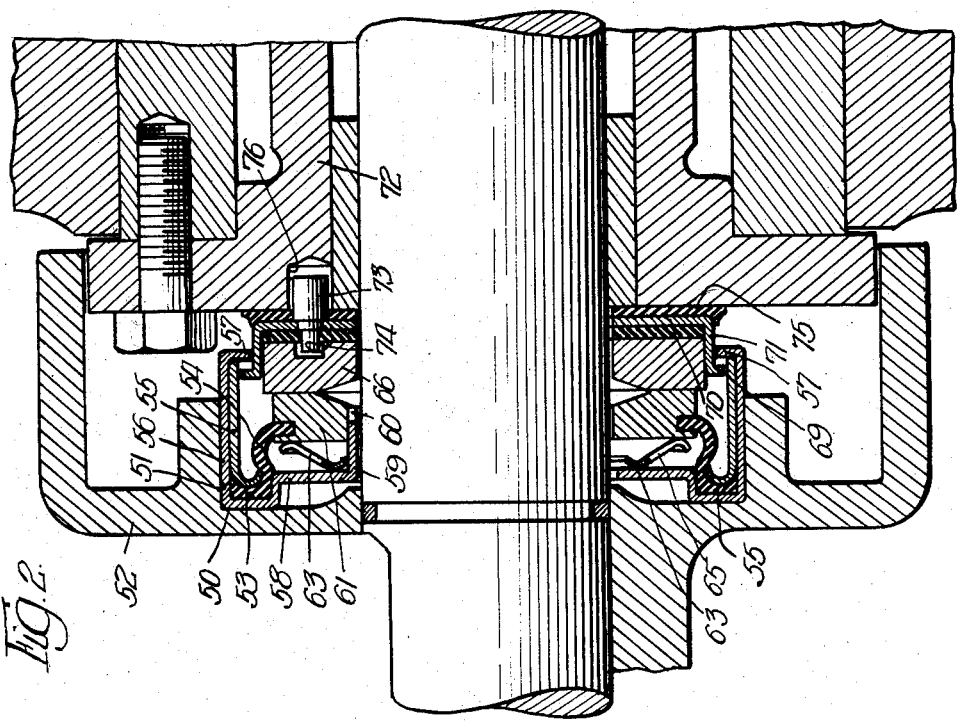
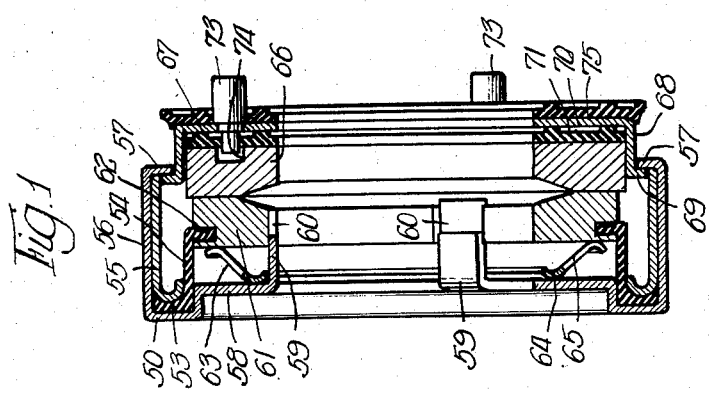
INVENTOR.
Leonard M. Dolhun,
BY
Cromwell, Greist & Warden
ATTYS.

2,879,093
SELF CONTAINED SEALS

Leonard M. Dolhun, Chicago, Ill., assignor to Chicago Rawhide Manufacturing Company, Chicago, Ill., a corporation of Illinois Original application May 15, 1951, Serial No. 226,415, now Patent No. 2,701,154, dated February 1, 1955. Divided and this application January 4, 1955, Serial No. 482,373

10 Claims. (Cl. 288—3)

The present invention relates to seals of the type commonly applied to a pair of relatively rotatable parts for the purpose of sealing these parts against the escape of lubricant or other liquid, the undesired entry of dirt and foreign matter, etc. In particular, the invention deals with a seal for such an installation which is wholly self-contained in character, in that it embodies in a preassembled unit both a sealing ring and a coacting mating ring against which the sealing ring is resiliently urged for relatively rotative sliding engagement at the meeting surfaces of the rings when the seal is installed.

This application is a division of copending application Serial No. 226,415, filed May 15, 1951, now U.S. Patent No. 2,701,154, issued February 1, 1955.

It is an object of the invention to provide a self-contained seal of the foregoing sort in which the sealing ring and mating ring are each individually mounted on a sheet metal casing member in a non-rigid relation thereto, which casing members provide an external housing for the seal enclosing its operating parts and have means for individually restraining the respective sealing and mating rings in a positive manner against rotation relative to one another and relative to the respective casing members.

Yet another object is to provide a seal which is very economically produced and quickly and economically assembled as a wholly self-contained unit, as well as installed after assembly in operative relation to a pair of relatively rotatable parts to be sealed, the seal being characterized by two telescoped casing members containing coacting sealing and mating rings, of which the latter is relatively loosely disposed in its casing member in order to avoid objectionably stressing the latter as might occur in force-fitting, and is keyed by the casing member against relative rotation, being axially sustained by the casing member under spring force applied through the sealing ring.

A still further object of the invention is to provide a self-contained seal of the foregoing character, in which the two coacting casing members of the seal, each associated in laterally enclosing relation to one of the rings referred to above, have axially telescoped portions of substantial axial length and provision on said portions for interengaging the same to prevent separation of the casings from one another prior to installation of the seal.

A still further object of the invention is to provide a self-contained seal having axially telescoped, interengageable casing members, one mounting a sealing ring and the other mounting a mating ring, in which the first named casing has an axial re-entrant portion providing circumferentially spaced axially extending lug or key elements which interlock with the sealing ring to restrain rotation of the latter, the re-entrant portion also serving as a centering means for an annular spring which acts between the casing member and associated sealing ring to urge the latter against the mating ring.

The foregoing statements are indicative in a general way of the nature of the invention. Other and more specific objects will be apparent to those skilled in the art upon a full understanding of the construction and operation of the device.

An embodiment of the invention is presented herein for purpose of illustration, and it will be appreciated that the invention may readily take other modified forms coming equally within the scope of the appended claims.

In the drawings:

Fig. 1 is a view in longitudinal or axial section through the seal fabricated in accordance with the invention, showing the same in expanded condition of its parts prior to installation; and Fig. 2 is a fragmentary view in section similar to Fig. 1, illustrating the seal in an operative, installed relation to a shaft and housing structure.

Figs. 1 and 2 illustrate a seal incorporating the principles of the invention. The outer casing member 50 is adapted to be force-fitted in a recess 51 of a part 52 with which the seal is associated. Casing member 50 is shaped to provide a re-entrant annular channel 53 which receives the radially flanged outer rim of an annular flexible diaphragm 54. A separate, terminally rolled clamp ring 55 is force-fitted within the elongated, axially extending portion 56 of casing member 50, engaging and clamping the rim of the diaphragm in the channel. The clamp ring is locked in place by an inwardly spun annular lip 57 on the right end margin of the casing.

Casing member 50 continues from the channel portion 53 in a form of a radially extending wall 58 and terminates in a plurality of axially disposed, circumferentially spaced segmental locking lugs 59 of substantial width, as illustrated in Fig. 1. These have axially slidable engagement in similarly spaced axial grooves 60 formed in the inner periphery of the sealing ring 61. The outer periphery of the sealing ring is provided with a circumferential groove or channel 62, in which the radially inturned margin of diaphragm 54 is fixedly clamped. Ring 61 is preferably hardened only part way back from its running sealing surface, leaving the zone adjoining groove 62 in ductile condition to facilitate clamping of the diaphragm. The sealing ring 61 is axially guided on the locking fingers 59 during the operation of the seal, as well as prevented from rotative movement relative to its casing member.

The aforesaid fingers 59 also serve to center in the space rearwardly of the sealing ring an annular finger spring 63 of known type, characterized by an inner annular body 64 and a plurality of resilient, circumferentially spaced spring fingers 65 which extend in a generally conical arrangement from the body. The rounded ends of these fingers engage the rear of sealing ring 61 to maintain engagement of the latter with a mating ring 66. Other types of spring, for example one in which spring fingers are struck out from an annular body in a circumferentially extending series, may be substituted for finger spring 63.

Mating ring 66 is relatively loosely received in the inner casing member 67 of the seal, being disposed inwardly of an axially extending, outer sleeve-like portion 68 of the latter. This sleeve-like portion terminates in a radially out-turned rim or flange 69 which is adapted to be restrainingly engaged by the radially spun lip 57 of outer casing member 50, as illustrated in Fig. 1, thus to restrain separation of the casing members and associated parts when the seal is not installed.

Inner casing member 67 has a radially extending rear wall 70 which axially sustains the mating ring against the force of spring 63, there being a sealing gasket 71 interposed between the mating ring and the wall.

Casing member 67 is restrained from rotation relative to a sealed part with which it is associated, for example, the flanged shaft hub 72 shown in Fig. 2, by means of a number of axially extending pins 73 secured to casing wall 70. The forward extremities of these pins extend through apertures in gasket 71 and are received in rear recesses 74 of the mating ring; the rear extremities thereof serve to center an outer sealing gasket 75 associated with the casing, and are received in interlocking recesses 76 formed in the part 72.

Entry of dirt or foreign matter, or escape of oil or other liquid between the outer casing and sealing ring is prevented by the diaphragm. The running seal between the mating and sealing rings acts similarly with regard to the opening between the casing members and the shaft space internally of the seal. The seal is entirely self-contained and is responsive without loss of efficiency to end play in operation of the installation. A minimum of parts is employed in the interest of low production cost and the cost of installation is also maintained at a minimum by the arrangements described.

I claim:

1. A self-contained seal for a pair of relatively rotatable parts, comprising an annular casing made up of a first casing member adapted to be disposed in fixed relation to one of said parts, and a second casing member mounted in coaxial axially telescoped relation to said first casing member and adapted to be disposed in non-rotative relation to the other of said parts, said first casing member being shaped to provide a re-entrant annular channel having one margin of a flexible annular sealing diaphragm fixedly received therein, an inwardly directed radial wall formed integrally with said channel and being provided at the innermost margin thereof with a plurality of axially disposed and circumferentially spaced lugs, a sealing ring associated with said first casing member in concentric axially movable relation therewith, the inner periphery of said sealing ring being provided with circumferentially spaced grooves for cooperation with said lugs, said diaphragm being secured along its other margin to said sealing ring, a mating ring axially abutted and sustained by said second casing member in relatively rotatable engagement with said sealing ring, and spring means intermediate said radial wall of said first casing member and said sealing ring to urge the latter against said mating ring to maintain said mating ring in axial abutment with its casing member, said casing members having means cooperating therebetween to prevent axial separation thereof under the force of said spring means, said mating ring and its casing member being provided with further means to prevent relative rotation therebetween.

2. A self-contained seal for a pair of relatively rotatable parts, comprising an annular casing made up of a first casing member adapted to be disposed in fixed relation to one of said parts, and a second casing member mounted in coaxial axially telescoped relation to said first casing member and adapted to be disposed in non-rotative relation to the other of said parts, said first casing member being shaped to provide a re-entrant annular channel having a flexible annular sealing diaphragm received therein, one margin of said diaphragm being provided with a radially flanged outer rim fixedly clamped in said re-entrant annular channel, an inwardly directed radial wall formed integrally with said channel and being provided at the innermost margin thereof with a plurality of axially disposed and circumferentially spaced lugs, a sealing ring associated with said first casing member in concentric axially movable relation therewith, said sealing ring having its outer periphery provided with a circumferential groove near the rear face thereof to fixedly receive the other margin of said diaphragm, the inner periphery of said sealing ring being provided with circumferentially spaced grooves for cooperation with said lugs, a mating ring axially abutted and sustained by said second casing member in relatively rotatable engagement with said sealing ring, and spring means intermediate said radial wall of said first casing member and said sealing ring to urge the latter against said mating ring to maintain said mating ring in axial abutment with its casing member, said casing members having means cooperating therebetween to prevent axial separation thereof under the force of said spring means, said mating ring and its casing member being provided with further means to prevent relative rotation therebetween.

3. A self-contained seal for a pair of relatively rotatable parts, comprising an annular casing made up of a first casing member adapted to be disposed in fixed relation to one of said parts, and a second casing member mounted in coaxially telescoped relation to said first casing member and adapted to be disposed in non-rotative relation to the other of said parts, said first casing member being shaped to provide a re-entrant annular channel having one margin of a flexible annular sealing diaphragm fixedly received therein, an inwardly directed radial wall formed integrally with said channel and being provided at the innermost margin thereof with a plurality of axially disposed and circumferentially spaced lugs, a sealing ring associated with said first casing member in concentric axially movable relation therewith, the inner periphery of said sealing ring being provided with circumferentially spaced grooves for cooperation with said lugs, said diaphragm being secured along its other margin to said sealing ring, a mating ring axially abutted and sustained by said second casing member in relatively rotatable engagement with said sealing ring, and spring means intermediate said radial wall of said first casing member and said sealing ring to urge the latter against said mating ring to maintain said mating ring in axial abutment with its casing member, said spring means including an annular ring received about the outer peripheries of said lugs and being provided with circumferentially spaced resilient fingers engaging the rear face of said sealing ring, said casing members having means cooperating therebetween to prevent axial separation thereof under the force of said spring means, said mating ring and its casing member being provided with further means to prevent relative rotation therebetween.

4. A self-contained seal for a pair of relatively rotatable parts, comprising an annular casing made up of a first casing member adapted to be disposed in fixed relation to one of said parts, and a second casing member mounted in coaxial axially telescoped relation to said first casing member and adapted to be disposed in non-rotative relation to the other of said parts, said first casing member being shaped to provide a re-entrant annular channel having one margin of a flexible annular sealing diaphragm fixedly received therein, an inwardly directed radial wall formed integrally with said channel and being provided at the inner most margin thereof with a plurality of axially disposed and circumferentially spaced lugs, a sealing ring associated with said first casing member in concentric axially movable relation therewith, the inner periphery of said sealing ring being provided with circumferentially spaced grooves for cooperation with said lugs, said diaphragm being secured along its other margin to said sealing ring, a mating ring axially abutted and sustained by said second casing member in relatively rotatable engagement with said sealing ring, and spring means intermediate said radial wall of said first casing member and said sealing ring to urge the latter against said mating ring to maintain said mating ring in axial abutment with its casing member, said casing members being provided at the telescoped margins thereof with axially overlapping oppositely directed radial rims which cooperate to prevent axial separation thereof under the force of said spring means, said mating ring and its casing member being provided with means to prevent relative rotation therebetween.

5. A self-contained seal for a pair of relatively rotatable parts, comprising an annular casing made up of a first casing member adapted to be disposed in fixed relation to one of said parts, and a second casing member mounted in coaxial axially telescoped relation to said first casing member and adapted to be disposed in non-rotative relation to the other of said parts, said first casing member being shaped to provide a re-entrant annular channel having one margin of a flexible annular sealing diaphragm fixedly received therein, an inwardly directed radial wall formed integrally with said channel and being provided at the innermost margin thereof with a plurailty of axially disposed and circumferentially spaced lugs, a sealing ring associated with said first casing member in concentric axially movable relation therewith, the inner periphery of said sealing ring being provided with circumferentially spaced grooves for cooperation with said lugs, said diaphragm being secured along its other margin to said sealing ring, a mating ring axially abutted and sustained by said second casing member in relatively rotatable engagement with said sealing ring, and spring means intermediate said radial wall of said first casing member and said sealing ring to urge the latter against said mating ring to maintain said mating ring in axial abutment with its casing member, said casing members having means cooperating therebetween to prevent axial separation thereof under the force of said spring means, said second casing member having a radially extending rear wall axially sustaining said mating ring against the force of said spring means, at least one axially extending pin carried by said radial rear wall and having ends extending therethrough on both sides thereof, one of said ends being received in a recess in said mating ring to prevent rotation thereof with respect to said second casing member, the other end cooperating with said part associated with said second casing member to prevent relative rotation therebetween.

6. A self-contained seal for a pair of relatively rotatable parts, comprising an annular casing made up of a first casing member adapted to be disposed in fixed relation to one of said parts, and a second casing member mounted in coaxial axially telescoped relation to said first casing member and adapted to be disposed in non-rotative relation to the other of said parts, said first casing member being shaped to provide a re-entrant annular channel having one margin of a flexible annular sealing diaphragm fixedly received therein, an inwardly directed radial wall formed integrally with said channel and being provided at the innermost margin thereof with a plurality of axially disposed and circumferentially spaced lugs, a sealing ring associated with said first casing member in concentric axially movable relation therewith, the inner periphery of said sealing ring being provided with circumferentially spaced grooves for cooperation with said lugs, said diaphragm being secured along its other margin to said sealing ring, a mating ring axially abutted and substained by said second casing member in relatively rotatable engagement with said sealing ring, and spring means intermediate said radial wall of said first casing member and said sealing ring to urge the latter against said mating ring to maintain said mating ring in axial abutment with its casing member, said casing members having means cooperating therebetween to prevent axial separation thereof under the force of said spring means, said second casing member having a radially extending rear wall axially sustaining said mating ring against the force of said spring means, a sealing gasket intermediate said rear wall and said mating ring, at least one axially extending pin carried by said radial rear wall and having ends extending therethrough on both sides thereof, one of said ends being received in a recess in said mating ring to prevent rotation thereof with respect to said second casing member, the other end cooperating with said part associated with said second casing member to prevent relative rotation therebetween.

7. A self-contained seal for a pair of relatively rotatable parts, comprising an annular casing member made up of a first casing member adapted to be disposed in fixed relation to one of said parts, and a second casing member mounted in coaxial axially telecoped relation to said first casing member and adapted to be disposed in non-rotative relation to the other of said parts, said first casing member being shaped to provide a reentrant annular channel having a flexible annular sealing diaphragm received therein, one margin of said diaphragm being provided with a radially flanged outer rim fixedly clamped in said re-entrant annular channel, an inwardly directed radial wall formed integrally with said channel and being provided at the innermost margin thereof with a plurality of axially disposed and circumferentially spaced lugs, a sealing ring associated with said first casing member in concentric axially movable relation therewith, said sealing ring having its outer periphery provided with a circumferential groove near the rear face thereof to fixedly receive the other margin of said diaphragm, the inner periphery of said sealing ring being provided with circumferentially spaced grooves for cooperation with said lugs, a mating ring axially abutted and sustained by said second casing member in relatively rotatable engagement with said sealing ring, and spring means intermediate said radial wall of said first casing member and said sealing ring to urge the latter against said mating ring to maintain said mating ring in axial abutment with its casing member, said spring means including an annular ring received about the outer peripheries of said lugs and being provided with circumferentially spaced resilent fingers engaging the rear face of said sealing ring, said casing members having means cooperating therebetween to prevent axial separation thereof under the force of said spring means, said mating ring and its casing member being provided with further means to prevent relative rotation therebetween.

8. A self-contained seal for a pair of relatively rotatable parts, comprising an annular casing made up of a first casing member adapted to be disposed in fixed relation to one of said parts, and a second casing member mounted in coaxial axially telescoped relation to said first casing member and adapted to be disposed in non-rotative relation to the other of said parts, said first casing member being shaped to provide a re-entrant annular channel having a flexible annular sealing diaphragm received therein, one margin of said diaphragm being provided with a radially flanged outer rim fixedly clamped in said re-entrant annular channel, an inwardly directed radial wall formed integrally with said channel and being provided at the innermost margin thereof with a plurality of axially disposed and circumferentially spaced lugs, a sealing ring associated with said first casing member in concentric axially movable relation therewith, said sealing ring having its outer periphery provided with a circumferential groove near the rear face thereof to fixedly receive the other margin of said diaphragm, the inner periphery of said sealing ring being provided with circumferentially spaced grooves for cooperation with said lugs, a mating ring axially abutted and sustained by said second casing member in relatively rotatable engagement with said sealing ring, and spring means intermediate said radial wall of said first casing member and said sealing ring to urge the latter against said mating ring to maintain said mating ring in axial abutment with its casing member, said spring means including an annular ring received about the outer peripheries of said lugs and being provided with circumferentially spaced resilient fingers engaging the rear face of said sealing ring, said casing members being provided at the telescoped margins thereof with axially overlapping oppositely directed radial rims which cooperate to prevent axial separation thereof under the force of said spring means, said mating ring and its casing member being provided with means to prevent relative rotation therebetween.

9. A self-contained seal for a pair of relatively rotatable parts, comprising an annular casing made up of a first casing member adapted to be disposed in fixed relation to one of said parts, and a second casing member mounted in coaxial axially telescoped relation to said first casing member and adapted to be disposed in non-rotative relation to the other of said parts, said first casing member being shaped to provide a re-entrant annular channel having a flexible annular sealing diaphragm received therein, one margin of said diaphragm being provided with a radially flanged outer rim fixedly clamped in said re-entrant annular channel, an inwardly directed radial wall formed integrally with said channel and being provided at the innermost margin thereof with a plurality of axially disposed and circumferentially spaced lugs, a sealing ring associated with said first casing member in concentric axially movable relation therewith, said sealing ring having its outer periphery provided with a circumferential groove near the rear face thereof to fixedly receive the other margin of said diaphragm, the inner periphery of said sealing ring being provided with circumferentially spaced grooves for cooperation with said lugs, a mating ring axially abutted and sustained by said second casing member in relatively rotatable engagement with said sealing ring, and spring means intermediate said radial wall of said first casing member and said sealing ring to urge the latter against said mating ring to maintain said mating ring in axial abutment with its casing member, said spring means including an annular ring received about the outer peripheries of said lugs and being provided with circumferentially spaced resilient fingers engaging the rear face of said sealing ring, said casing members being provided at the telescoped margins thereof with axially overlapping oppositely directed radial rims which cooperate to prevent axial separation thereof under the force of said spring means, said second casing member having a radially extending rear wall axially sustaining said mating ring against the force of said spring means, a sealing gasket intermediate said rear wall and said mating ring, at least one axially extending pin carried by said radial rear wall and having ends extending therethrough on both sides thereof, one of said ends being received in a recess in said mating ring to prevent rotation thereof with respect to said second casing member, the other end cooperating with said part associated with said second casing member to prevent relative rotation therebetween.

10. A self-contained seal for a pair of relatively rotatable parts, comprising a first annular casing member including a radially inwardly directed wall portion joined with an axially extending portion forming a part thereof, said first casing member including means for mounting the same in fixed relation to one of said parts, a second annular casing member including a radially inwardly directed wall portion integrally joined with an axially extending portion along the outer periphery thereof, means for mounting said second casing member in fixed relation to the other of said parts, the axially extending portion of said second casing member being telescopically received within the axially extending portion of said first casing member with both of said portions being provided with radially overlapping integral elements at the ends thereof to prevent axial separation of said casing members, a sealing ring received in said first casing member in concentric axially movable relation thereto, restraining means associated with said first casing member to prevent relative rotation of said sealing ring, said restraining means being in the form of a plurality of axial projections received in aligned openings in said sealing ring, a flexible annular diaphragm secured at opposite margins to said sealing ring and said first casing member, a mating ring axially abutted and sustained in unattached engagement with and by said second casing member and said sealing ring and being in relatively rotatable engagement with said sealing ring, spring means mounted between said first casing member and said sealing ring and acting axially therebetween to urge said rings against one another and maintain said mating ring in axial abutment within said second casing member, and means forming a part of said second casing member and said mating ring to prevent relative rotation therebetween.

References Cited in the file of this patent

UNITED STATES PATENTS

| | | |
|---|---|---|
| 2,321,871 | Stevenson | June 15, 1943 |
| 2,347,118 | Matter | Apr. 18, 1944 |
| 2,489,781 | Isenbarger | Nov. 29, 1949 |
| 2,500,898 | Hastings | Mar. 14, 1950 |
| 2,615,739 | Vedovell | Oct. 28, 1952 |